US012384333B2

(12) United States Patent
Villegas Muriel et al.

(10) Patent No.: US 12,384,333 B2
(45) Date of Patent: Aug. 12, 2025

(54) METHODS FOR PROVIDING CORRECT BRAKE REQUEST WITH A STUCK E-PEDAL

(71) Applicant: FORD GLOBAL TECHNOLOGIES, LLC, Dearborn, MI (US)

(72) Inventors: Roberto Villegas Muriel, Atizapan de Zaragoza (MX); Thomas Svensson, Leichlingen (DE); Andrew Stoscup, Wixom, MI (US); Harold John Felch, Novi, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 197 days.

(21) Appl. No.: 18/318,097

(22) Filed: May 16, 2023

(65) Prior Publication Data
US 2024/0383451 A1    Nov. 21, 2024

(51) Int. Cl.
| | |
|---|---|
| *B60T 7/04* | (2006.01) |
| *B60T 8/32* | (2006.01) |
| *B60T 8/88* | (2006.01) |
| *B60T 8/92* | (2006.01) |
| *B60T 17/22* | (2006.01) |

(52) U.S. Cl.
CPC .......... *B60T 7/042* (2013.01); *B60T 8/3255* (2013.01); *B60T 8/885* (2013.01); *B60T 8/92* (2013.01); *B60T 17/22* (2013.01); *B60T 2270/404* (2013.01); *B60T 2270/406* (2013.01); *B60T 2270/82* (2013.01); *B60T 2270/88* (2013.01)

(58) Field of Classification Search
CPC ........ B60T 7/042; B60T 8/3255; B60T 8/885; B60T 8/92; B60T 17/22; B60T 2270/404; B60T 2270/406; B60T 2270/82; B60T 2270/88
See application file for complete search history.

(56) References Cited

U.S. PATENT DOCUMENTS

| | | |
|---|---|---|
| 6,309,031 B1 | 10/2001 | Crombez et al. |
| 8,706,358 B2 | 4/2014 | Dewitt |
| 9,506,954 B2* | 11/2016 | Kim ........................ G01R 19/00 |
| 9,702,315 B1* | 7/2017 | Palmer ................. G07C 5/0808 |
| 2008/0243323 A1 | 10/2008 | Karnjate et al. |
| 2021/0245774 A1* | 8/2021 | Suzuki ....................... B60T 8/88 |
| 2023/0192048 A1* | 6/2023 | Moon ........................ B60T 1/10 701/22 |

FOREIGN PATENT DOCUMENTS

| | | | | |
|---|---|---|---|---|
| CN | 116215468 A | * | 6/2023 | .............. B60T 17/18 |
| DE | 19841335 A1 | | 8/1999 | |
| DE | 19933517 A1 | | 5/2000 | |
| DE | 102014226211 A1 | | 6/2016 | |
| EP | 1051315 A1 | | 11/2000 | |
| WO | WO-2005100109 A1 | * | 10/2005 | ................ B60T 7/12 |
| WO | WO-2010052831 A1 | * | 5/2010 | ............ E02F 9/2235 |

* cited by examiner

*Primary Examiner* — Joseph J Dallo
(74) *Attorney, Agent, or Firm* — Lorne Forsythe; Brooks Kushman P.C.

(57) ABSTRACT

A vehicle includes a brake-by-wire system having a brake pedal and first and second sensors. The first sensor is configured to output a first signal indicative of a position of the brake pedal and the second sensor is configured to output a second signal indicative of the position. A controller is programmed to command a braking torque based on only the first signal when a travel of the brake pedal is limited to a first range.

20 Claims, 4 Drawing Sheets

| Baseline Lookup Table for S1 ||
|---|---|
| S1 | Pedal Output Contribution |
| 5° | 10% |
| 10° | 20% |
| 15° | 30% |
| 20° | 40% |
| 25° | 50% |
| 30° | 60% |
| 35° | 70% |

| Secondary Lookup Table for S1 ||
|---|---|
| S1 | Pedal Output Contribution |
| 5° | 14% |
| 10° | 28% |
| 15° | 43% |
| 20° | 57% |
| 25° | 71% |
| 30° | 85% |
| 35° | 100% |

| Baseline Lookup Table for S2 | |
|---|---|
| S1 | Pedal Output Contribution |
| 5° | 0% |
| 10° | 0% |
| 15° | 0% |
| 20° | 40% |
| 25° | 50% |
| 30° | 60% |
| 35° | 70% |

| Secondary Lookup Table for S2 | |
|---|---|
| S2 | Pedal Output Contribution |
| 5° | 0% |
| 10° | 0% |
| 15° | 0% |
| 20° | 15% |
| 25° | 45% |
| 30° | 70% |
| 35° | 100% |

METHODS FOR PROVIDING CORRECT BRAKE REQUEST WITH A STUCK E-PEDAL

TECHNICAL FIELD

This disclosure relates to vehicles having brake-by-wire systems.

BACKGROUND

Vehicles include friction brakes located at the wheels for slowing the vehicle based on input from a brake pedal. Traditionally, a hydraulic system provided the braking force. Advances in electronics have enabled brake-by-wire systems in which the brake pedal is no longer directly connected to a hydraulic system.

SUMMARY

According to one embodiment, a vehicle includes a brake-by-wire system having a brake pedal and first and second sensors. The first sensor is configured to output a first signal indicative of a position of the brake pedal and the second sensor is configured to output a second signal indicative of the position. A controller is programmed to command a braking torque based on only the first signal when a travel of the brake pedal is limited to a first range.

According to another embodiment, a vehicle includes a brake-by-wire system having a brake pedal, and first and second sensors. The first sensor is configured to output a first signal indicative of a position of the brake pedal and the second sensor being configured to output a second signal indicative of the position. A controller is in communication with the sensors and is programmed to: in response to application of the brake pedal, command a braking torque according to a baseline lookup table based on the first signal, the second signal, or both, and, in response to a discrepancy being detected in the first signal, command a braking torque according to a secondary lookup table based on the second signal only.

According to yet another embodiment, a method of controlling a brake-by-wire system of a vehicle includes: in response to application of a brake pedal of a brake-by-wire system, commanding a braking torque according to a baseline lookup table based on signals of a first brake-pedal position sensor, a second brake-pedal position sensor, or both; and, in response to the brake pedal being incapable of full travel, commanding a braking torque according to a secondary lookup table based on the signal of the first brake-pedal position sensor or the signal of the second brake-pedal sensor, but not the signals of both the first brake-pedal position sensor and the second brake-pedal position sensor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
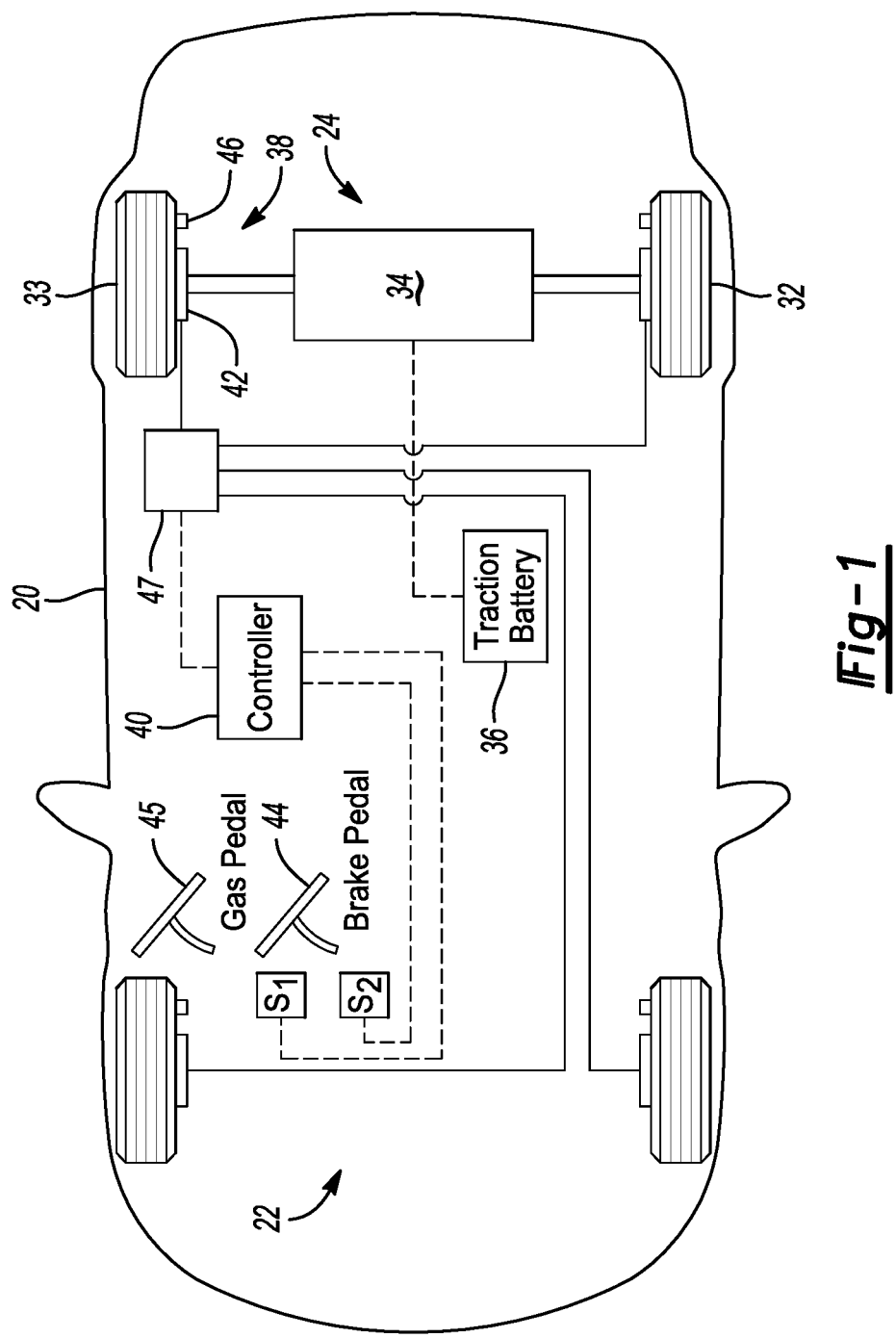
FIG. 1 illustrates a schematic diagram of an example electrified vehicle.

Referring to FIG. 1, an electrified vehicle 20 is illustrated as a fully electric vehicle but, in other embodiments, the vehicle 20 may be a hybrid-electric vehicle that includes an internal-combustion engine, or a conventionally powered vehicle that only includes an engine. The vehicle 20 is shown as being two-wheel drive (such as front-wheel drive or rear-wheel drive) but may be all-wheel drive (AWD) in other embodiments. The vehicle 20 may include a powertrain 24 including a powerplant, e.g., an electric machine 34 or an engine.

The electric machine 34 is operably coupled to driven wheels 30 and 32. A gearbox (not shown) may be included to change a speed ratio between the electric machine 34 and the wheels 30, 32. The electric machine may be one or more electric machines. The electric machine 34 is capable of acting as motor to provide a positive torque to propel the vehicle 20 and is capable of acting as a generator to provide a negative torque to brake the vehicle such as via regenerative braking. The electric machine 34 may be a permanent magnet three-phase alternating current (AC) electric motor or other suitable type.

The electric machine 34 is powered by one or more traction batteries, such as traction battery 36. The traction battery 36 stores energy that can be used by the electric machine 34. The traction battery 36 may provide a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally adjusted with a thermal management system.

The traction battery 36 may be electrically connected to one or more power-electronics modules through one or more contactors. The module may be electrically connected to the electric machine 34 and may provide the ability to bi-directionally transfer electrical energy between the traction battery 36 and the electric machine 34. For example, a traction battery 36 may provide a DC voltage while the electric machine 34 may require a three-phase AC. The power-electronics module may convert the DC voltage to a three-phase AC voltage as required by the electric machines. In a generator mode, which may be during regenerative braking, the power-electronics module may convert the three-phase AC voltage from the electric machine 34 acting as a generator to the DC voltage required by the traction battery 36.

The vehicle 20 includes one or more controllers 40 in electric communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables," that are based on calculations and test data, and are stored within the memory. The controller 40 may communicate with other vehicle systems and controllers over one or more wired or wireless vehicle connections using common bus protocols (e.g., CAN and LIN). Used herein, any reference to "a controller" refers to one or more controllers. The controller 40 may include battery energy control module (BECM) that operates at least the traction battery, a powertrain control module (PCM) that operates at least the electric machine, and a brake control module that controls the braking system 38.

The controllers communicate with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by a controller within each of the subsystems identified above.

The braking system 38 may be a hydraulic system, an electric system, or a combination of electric and hydraulic. The braking system 38 is a brake-by-wire system that uses pedal sensors ($S_1$ and $S_2$) and actuators to engage the brakes rather than a conventional direct mechanical connection between the brake pedal and the master cylinder. The pedal sensors ($S_1$ and $S_2$) are configured to sense movement of the brake pedal 44 and output signals. The sensors ($S_1$ and $S_2$) may be packaged with the brake pedal 44 as a brake-pedal assembly. The signals include data indicative of a position of the brake pedal 44, which may be expressed as a percentage of depression or the like. The pedal sensors ($S_1$ and $S_2$) output this data to a braking control module of the controller (s) 40.

The brake system 38 may include one or more master cylinders 47 in fluid communication with a plurality of friction brakes 42 located at each of the wheels. The one or more master cylinders 47 are actuated by the controller 40 based on the data received from the pedal sensors ($S_1$ and $S_2$) as well as other factors. This is just one example and other types of brake-by-wire systems are contemplated, such as electro-mechanical brakes. These systems may not include a master cylinder. Modern vehicles typically have disc brakes; however, other types of friction brakes are available, such as drum brakes. In an example embodiment, each of the brakes 42 are in fluid communication with a valve body (not shown) via brake lines configured to deliver fluid pressure from the master cylinder 47 to a caliper of the brakes 42. The valve body may include a plurality of valves configured to provide independent fluid pressure to each of the brakes 42, such a system is commonly referred to as ABS. The braking system 38 also includes associated wheel-speed sensors 46 each located at one of the wheels. Each sensor 46 is configured to output a wheel-speed signal to the controller 40 indicative of a measured wheel speed.

The vehicle 20 is configured to brake using powertrain braking (e.g., regenerative braking), friction braking, or a combination thereof depending on the powertrain of the vehicle. The brake control module includes programming for aggregating a demanded braking torque between the electric machine 34 and the friction brakes 42. The demanded braking torque may be based on driver input, e.g., a position of the brake pedal 44, or by the controller 40. The aggregator may be programmed to slow the vehicle using regenerative braking whenever possible and apply the friction brakes 42 when necessary.

The vehicle 20 includes an accelerator pedal 45. The accelerator pedal 45 includes a range of travel from a released position to a fully depressed position and indeterminate positions therebetween. The released position may be considered a zero percent position and the fully depressed position may be considered a 100 percent position. Releasing the pedal may be referred to as decreasing the accelerator pedal position, and applying the pedal may be referred to as increasing the accelerator pedal position. The accelerator pedal 45 includes an associated sensor (not shown) that senses the position of the pedal 45. The sensor is configured to output a pedal-position signal to the controller 40 that is indicative of a sensed position of the pedal 45, i.e., an accelerator-pedal position. The accelerator pedal 45 is used by the driver to command a desired speed and torque of the vehicle. That is, the accelerator pedal 45 is used by the driver to set a driver-demanded torque. The driver-demanded torque may be a positive value or a negative value. A positive value indicates a propulsion torque, whereas a negative value indicates a braking torque. The controller 40 may be programmed to receive the accelerator pedal-position signal and determine the driver-demanded torque based on the accelerator pedal position and other factors such as vehicle speed.

Figure 2:
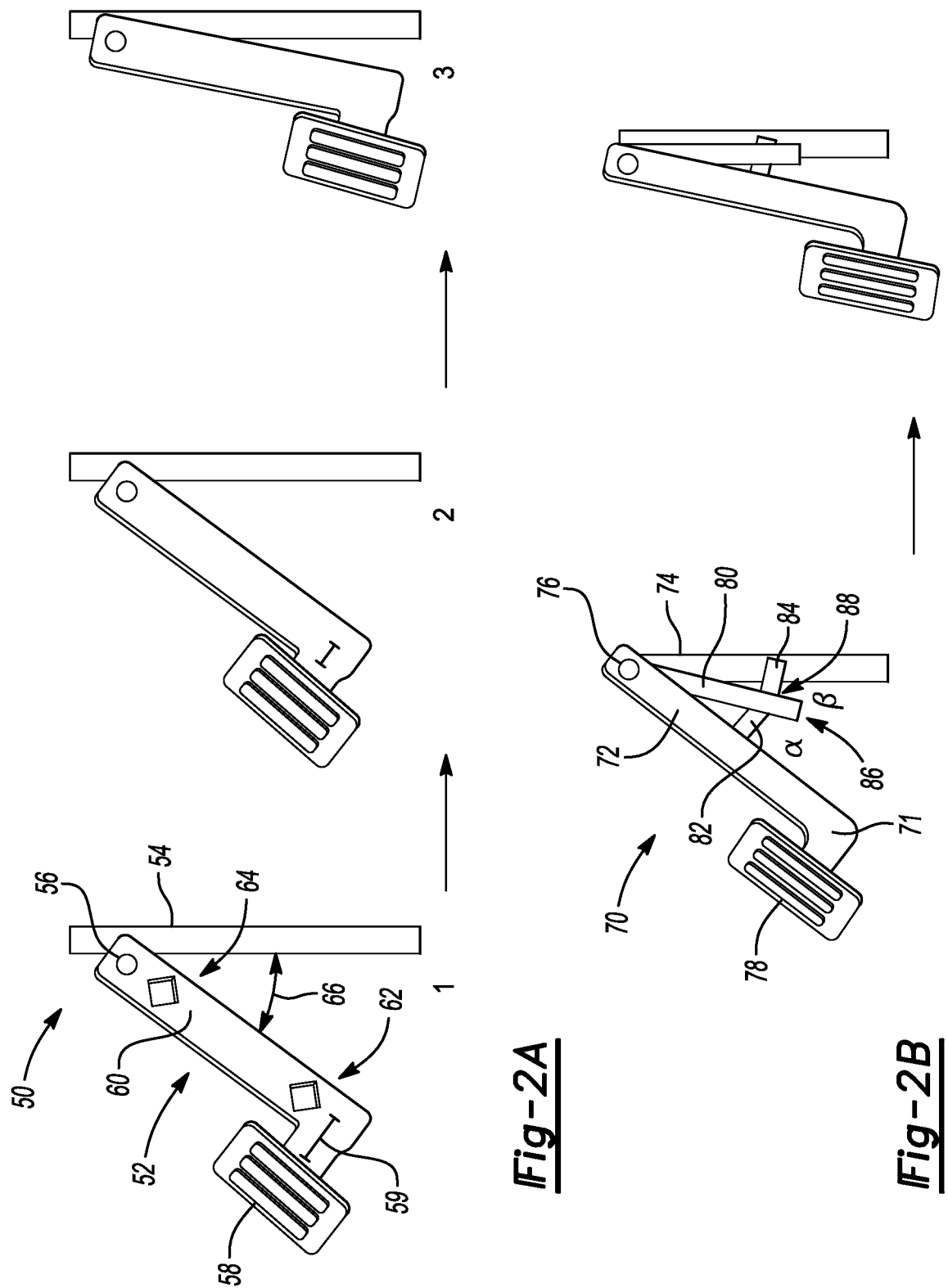
FIG. 2A illustrates an electronic brake pedal according to one example.
FIG. 2B illustrates an electronic brake pedal according to another example.

FIGS. 2A and 2B illustrate example embodiments of the of the brake pedal 44. Referring to FIG. 2A, a brake pedal assembly 50 of a brake-by-wire system includes a pedal 52 pivotably mounted to a support 54 of a vehicle body about a pivot axis 56. The pedal 52 includes a foot portion 58 attached to a lever portion 60. The foot portion 58 may be movable relative to the lever portion 60. For example, the foot portion 58 may be slidably received in a guide member 59 and has a first travel 59. Movement of the foot portion 58 relative to the lever portion 60 may be sensed by a first sensor 62. That is, the first sensor 62 senses the first travel 59 of the brake pedal 52. The pivoting of the lever portion 60 relative to the support 54 about the pivot axis 56 may be measured by a second sensor 64. When the brake pedal 52 is depressed by a driver, the foot portion 58 is first depressed towards the lever portion 60, which is still stationary. Once the foot portion 58 reaches the end of the first travel 59, the lever portion 60 begins to rotate about the axis 56 through a second travel 66. (In other embodiment, the lever portion 60 may begin moving before the foot portion bottoms out.) In this example, the first travel 59 is linear distance whereas the second travel is an angular distance.

Referring to FIG. 2B, another brake pedal assembly 70 includes a pedal 71 having lever portion 72 pivotally connected to a support 74 about a pivot axis 76. A foot portion 78 is rigidly attached to the lever portion 72. The brake pedal assembly 70 is an example of a dual-angle ePedal in which both the first sensor and the second sensor measure angles of movement. The pedal assembly 70 includes an intermediate member 80 that is pivotally attached about the pivot axis 76. A first linkage 82 connects between the lever portion 72 and the intermediate member 80. A second linkage 84 connects between the intermediate member 80 and the support 74. The pedal 71 is designed to move in two phases: During the first phase, the lever portion 72 rotates through its travel (a first travel 86) while the intermediary member 80 remains stationary. At the end of the first travel 86, the lever portion 72 begins to drive the intermediary member 80 towards the support 74 through a second range of travel 88. (In other embodiments, the intermediary member 80 may begin moving before the lever portion reaches the end of the first travel 86.)

The first sensor 90 measures the angle (a) between the lever portion 72 and the intermediate member 80. The second sensor 92 measures the angle (B) between the support 74 and the intermediate member 80. When the pedal 71 is depressed from full release, the lever portion 72 moves towards the intermediate member 80, which is stationary at this point. Here, movement of the pedal is sensed only by the first sensor 90. As the driver further depresses the pedal, the intermediate member 80 begins to pivot and the pedal movement is sensed by the second sensor 92 (in some implementations both the sensors 90/92 will measure pedal movement during this phase of movement).

Figures 3, 4, 5:
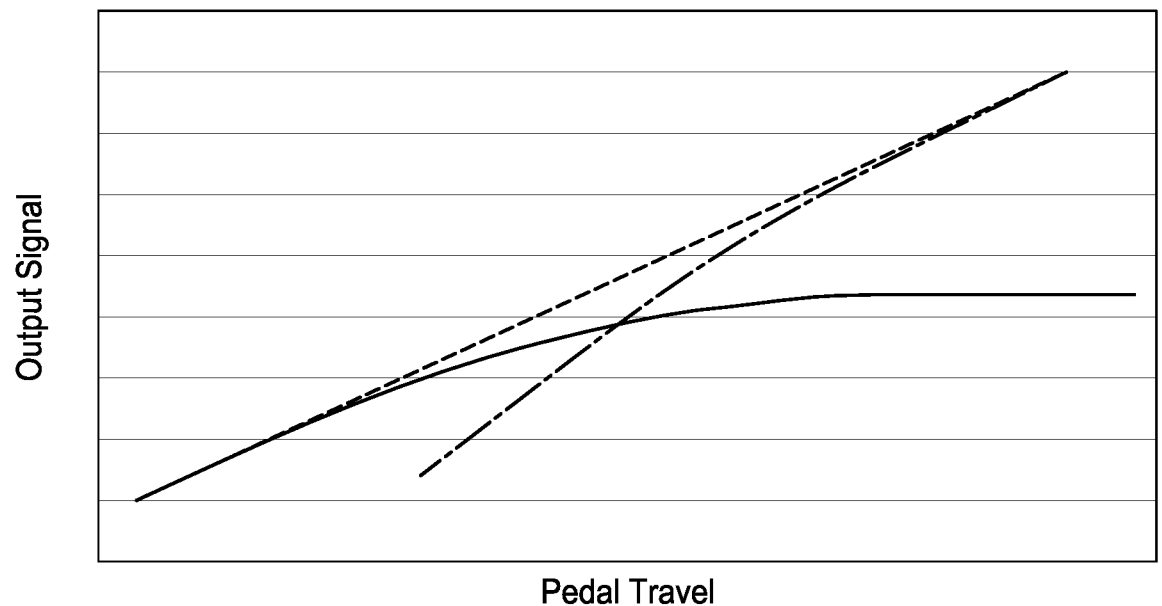
FIG. 3 is a graph showing plots of brake-pedal sensor readings and the resulting brake torque command.
FIG. 4 is a baseline lookup table associated with a first brake-pedal sensor.
FIG. 5 is a secondary lookup table associated with a first brake-pedal sensor.

FIG. 3 illustrates plots of first sensor data 100, second sensor data 102, and requested brake torque 104 during a braking event of the vehicle in which the brake pedal assembly is functioning normally. As shown in the graph, the first sensor 100 senses the initial movement of the brake pedal and the second sensor 102 senses the final movement of the brake pedal. In this example, the first and second sensors have significant overlap during an intermediate portion of pedal travel. The braking torque 104 is based on the data from the first and second sensors. In this example, the braking torque 104 is mostly based on readings from the first sensor 100 during the first half brake pedal travel. Similarly, the braking torque 104 is mostly based on readings from the second sensor 102 during the second half of brake pedal travel.

If one or more movable portions of the brake pedal becomes mechanically stuck or one or more of the sensors becomes inoperable or inaccurate, the data being received by the controller may no longer be accurate. This may result in a non-optimal braking torque command 104 and/or result in abrupt steps in the braking torque 104 rather than the smooth continuum shown in FIG. 3. For example, if the controller is not properly receiving the $S_1$ signal, the controller may command less braking torque during the first half of pedal travel and then abruptly jump to a higher braking torque once the second sensor becomes dominant. The below-described controls provide redundancy to ensure a smooth braking torque curve.

The controller 40 may include memory that stores mapping or lookup tables and arbitration logic that outputs a desired braking torque 104 based at least on data from the first sensor, the second sensor, both, and/or potentially other factors. FIG. 4 illustrates a simplified example (for the purposes of description) of a baseline lookup table 110. In this example, the first sensor $S_1$ measures the first travel of the pedal. FIG. 5 illustrates a simplified example (for the purposes of description) of a secondary lookup table 112 that is used when a discrepancy is sensed with regards to the second sensor $S_2$ ($S_1$ is still functioning normally). In comparing these lookup tables, it can be seen that the pedal outputs contribution is increased for the secondary lookup table 112 to account for the inaccurate information being received from the second sensor $S_2$. By using the secondary lookup table, 100 percent of the pedal contribution can come from $S_1$ so that full braking torque can be commanded without an accurate signal from the second sensor $S_2$.

Figures 6, 7, 8:
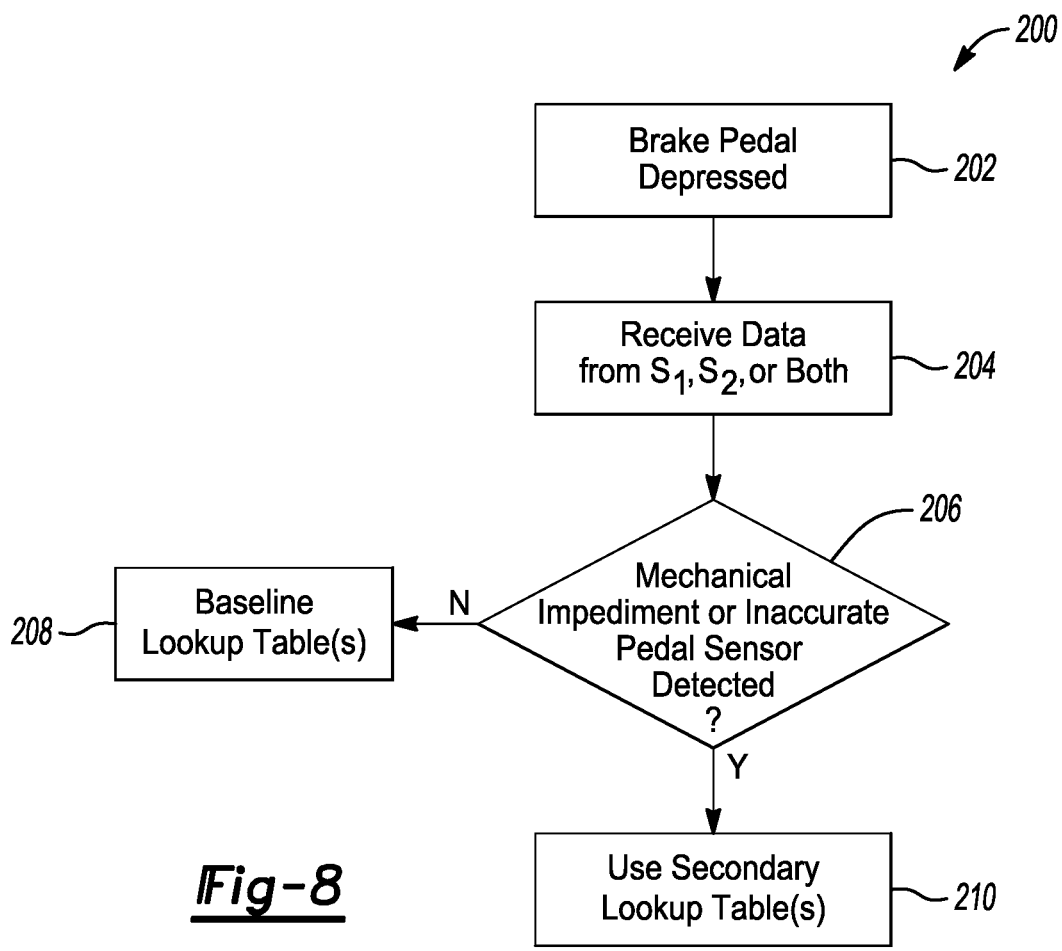
FIG. 6 is a baseline lookup table associated with a second brake-pedal sensor.
FIG. 7 is a secondary lookup table associated with a second brake-pedal sensor.
FIG. 8 is a flow chart of an algorithm for controlling braking torque in an example brake-by-wire system.

FIGS. 6 and 7 show baseline and secondary brake-torque lookup tables for sensor $S_2$. FIG. 6 illustrates a simplified example (for the purposes of description) of a baseline lookup table 114. In this example, the first sensor $S_1$ measures the first travel of the pedal. FIG. 7 illustrates a simplified example (for the purposes of description) of a secondary lookup table 116 that is used when a discrepancy is sensed with regards to the second sensor $S_1$ ($S_2$ is still functioning normally). In comparing these lookup tables, it can be seen that the pedal outputs contribution is initially decreased for the secondary lookup table 116 to account for the inaccurate information being received from the second sensor $S_1$. By using the secondary lookup table, an abrupt spike in braking torque does not occur while still providing full braking torque based only on the second sensor $S_2$.

The controller may be programmed to utilize the baseline lookup table(s) when it is determined that the pedal is operating normally. That is, the pedal is mechanically sound and the sensors are outputting accurate information. If the controller determines that one or more portions of the pedal are stuck and inhibiting proper movement of the pedal through its various ranges of travel, or one or more of the sensors are outputting inaccurate information, the secondary lookup table(s) are used to account for the issue and provide redundancy. For example, the controller may be programmed to command a braking torque based on only the first signal when a travel of the brake pedal is limited to a first range and/or command the braking torque based on only the second signal when the travel of the brake pedal is limited to a second range.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

FIG. 8 is a flowchart 200 of an algorithm for controlling a brake-by-wire system. At operation 202, the pedal is depressed by the driver to initiate a braking event. At operation 204, the controller receives data from the pedal sensors $S_1$, $S_2$, or both. At operation 206, the controller determines whether or not a mechanical impediment or and in accurate pedal sensor is detected. If no, the pedal assembly is operating normally, and the baseline lookup table(s) are used to determine the driver-demanded braking torque at operation 208. If the received sensor data indicates an issue with the brake pedal or sensors, control passes to operation 210 and the controller uses the secondary lookup table(s) to determine the driver-demanded braking torque.

When the secondary tables are used, the controller may be programmed to command a braking torque based on only the first signal when a travel of the brake pedal is limited to a first range or to command the braking torque based on only the second signal when the travel of the brake pedal is limited to a second range. Additionally or alternatively, the controller also be programmed in response to a discrepancy being detected in the first signal, command a braking torque according to a secondary lookup table based on the second signal only and/or in response to a discrepancy being detected in the second signal, command another braking torque according to another secondary lookup table based on the first signal only.

The controller may determine a discrepancy in the sensor data by comparing the sensor data to expected values. If the sensor data does not match the expected values, this is indicative of a discrepancy. Alternatively, the control may compare pedal movements of the first travel to the second travel. For example, if $S_1$ data is increasing while the $S_2$ data is static, that is indicative of a discrepancy. In yet another example, the controller flags a discrepancy responsive to $S_1$ or $S_2$ being unable to reach its maximum value. These are just some examples and are not an exhaustive list of ways for detecting anomalies in brake pedal operation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a brake-by-wire system including a brake pedal assembly, the brake pedal assembly having a brake pedal and first and second sensors that each sense movement of the brake pedal, the first sensor being configured to output a first signal indicative of a position of the brake pedal and the second sensor being configured to output a second signal indicative of the position of the brake pedal; and
a controller programmed to command a braking torque based on only the first signal when a travel of the brake pedal is limited to a first range.

2. The vehicle of claim 1, wherein the controller is further programmed to command the braking torque based on both the first and second signals when the travel of the brake pedal is not impeded.

3. The vehicle of claim 1, wherein the controller is further programmed to command the braking torque based on only the second signal when the travel of the brake pedal is limited to a second range.

4. The vehicle of claim 3, wherein the first and second ranges do not overlap.

5. The vehicle of claim 1, wherein the first sensor is configured to sense movement of the brake pedal within the first range but not the second range, and the second sensor is configured to sense movement of the brake pedal within the second range but not the first range.

6. The vehicle of claim 1, wherein the first sensor senses angular position of the brake pedal.

7. The vehicle of claim 6, wherein the second sensor senses linear movement of the brake pedal or pressure applied to the brake pedal.

8. The vehicle of claim 6, wherein the second sensor senses angular position of the brake pedal.

9. A vehicle comprising:
a brake-by-wire system including a brake pedal, and first and second sensors, the first sensor being configured to output a first signal indicative of a position of the brake pedal and the second sensor being configured to output a second signal indicative of the position; and
a controller in communication with the sensors, the controller being programmed to:
in response to application of the brake pedal, command a braking torque according to a baseline lookup table based on the first signal, the second signal, or both, and
in response to a discrepancy being detected in the first signal, command a braking torque according to a secondary lookup table based on the second signal only.

10. The vehicle of claim 9, wherein the controller is further programmed to, in response to a discrepancy being detected in the second signal, command another braking torque according to another secondary lookup table based on the first signal only.

11. The vehicle of claim 9, wherein the first sensor measures a first range of travel of the brake pedal, and the second sensor measures a second range of travel of the brake pedal.

12. The vehicle of claim 9, wherein the secondary lookup table is associated with the other of the first and second signals.

13. The vehicle of claim 12, wherein, for a same value of the second signal, the baseline lookup table and the secondary lookup table output different values of braking torque.

14. The vehicle of claim 12 further comprising memory associated with the controller and storing thereon the baseline lookup table, the secondary lookup table, and another secondary lookup table associated the first signal.

15. The vehicle of claim 9, wherein the first sensor senses angular position of the brake pedal and the second sensor senses pressure applied to the brake pedal or linear movement of the brake pedal.

16. A method of controlling a brake-by-wire system of a vehicle, the method comprising:
in response to application of a brake pedal of a brake-by-wire system, commanding a braking torque according to a baseline lookup table based on signals of a first brake-pedal position sensor, a second brake-pedal position sensor, or both; and
in response to the brake pedal being incapable of full travel, commanding a braking torque according to a secondary lookup table based on the signal of the first brake-pedal position sensor or the signal of the second brake-pedal sensor, but not the signals of both the first brake-pedal position sensor and the second brake-pedal position sensor.

17. The method of claim 16, wherein the first sensor measures a first range of travel of the brake pedal, and the second sensor measures a second range of travel of the brake pedal.

18. The method of claim 16, wherein, for a same value of the first sensor, the baseline lookup table and the secondary lookup table output different values of braking torque.

19. The method of claim 16, wherein, for a same value of the first sensor, the baseline lookup table outputs a first value of braking torque and the secondary lookup table outputs a second, larger value of braking torque.

20. The vehicle of claim 9 further comprising a brake pedal assembly that includes the brake pedal, the first sensor, and the second sensor, wherein the first and second sensors are configured to sense movement of the brake pedal.

\* \* \* \* \*